United States Patent [19]
Sakamoto et al.

[11] Patent Number: 5,218,398
[45] Date of Patent: Jun. 8, 1993

[54] EXPOSURE AMOUNT INDICATOR

[75] Inventors: Hiroshi Sakamoto, Kawasaki; Nobuyoshi Hagiuda, Yokohama; Norikazu Yokonuma, Tokyo; Hideki Matsui, Yokohama; Ryotaro Takayanagi, Yokosuka, all of Japan

[73] Assignee: Nikon Corporation, Tokyo, Japan

[21] Appl. No.: 825,084

[22] Filed: Jan. 24, 1992

[30] Foreign Application Priority Data

Jan. 29, 1991 [JP] Japan .................... 3-7664[U]

[51] Int. Cl.⁵ .................... G03B 17/18; G03B 15/05
[52] U.S. Cl. .................... 354/416; 354/475; 354/127.1
[58] Field of Search ............ 354/416, 472, 474, 475, 354/127.1

[56] References Cited

U.S. PATENT DOCUMENTS

| | | | |
|---|---|---|---|
| 4,122,465 | 10/1978 | Hasegawa et al. | 354/127.1 |
| 4,519,683 | 5/1985 | Hagyuda et al. | 354/416 X |
| 4,985,725 | 1/1991 | Serikawa | 354/416 |

FOREIGN PATENT DOCUMENTS 61-182533  11/1986  Japan .
1-297635  11/1989  Japan .

Primary Examiner—Michael L. Gellner
Assistant Examiner—Jae N. Noh
Attorney, Agent, or Firm—Shapiro and Shapiro

[57] ABSTRACT

A TTL automatic light modulation electronic flash device having transmission means, control means and indication means is combined with a camera. The electronic flash device receives a signal from the camera in the transmission means, and the control means controls the indication means to indicate data concerning an improper exposure amount.

2 Claims, 7 Drawing Sheets

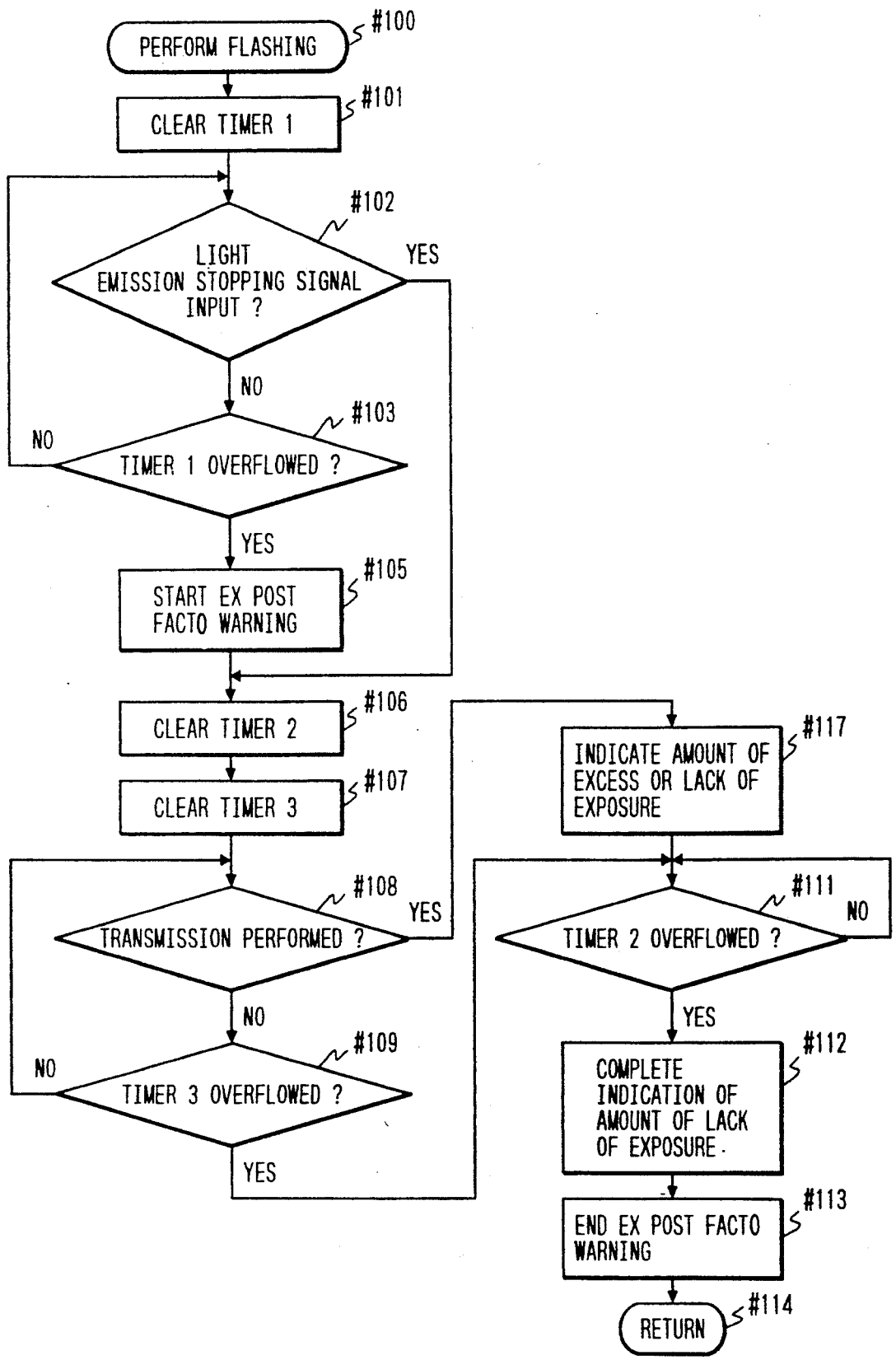

EXPOSURE AMOUNT INDICATOR

BACKGROUND OF THE INVENTION

1. Field of the Invention

This invention relates to an exposure amount indicator for indicating the result of the light modulation of an electronic flash device in a camera system.

2. Related Background Art

There has heretofore been TTL automatic flash control as the automatic light modulation system of an electronic flash device in a camera system. As such TTL automatic light modulation, system there has been one in which when proper exposure is not reached even if flash emission of a maximum possible light amount (hereinafter referred to as the full light emission) is effected, warning is indicated (hereinafter referred to as the ex post facto warning), and when a light modulation operation has been performed before the full light emission, a normal operation is indicated to thereby effect the confirmation of light emission.

In the prior-art TTL automatic light modulation, system it could be known that even when the electronic flash device effected the full light emission, proper exposure was not yet reached. However, how much deficient the exposure is cannot be known, and how much more the aperture of the photo-taking lens should be opened to prevent under-exposure when photographing is to be effected again cannot be known. There has also been a case where if under-exposure is very slight, it is within a range that can be made up for by the latitude of film and therefore photographing need not be effected again. Nevertheless, wasteful photographing has sometimes been repeated because how much deficient the exposure is cannot be known. This has also held true of over-exposure.

Japanese Laid-Open Utility Model Application No. 61-182533 discloses a technique of detecting the quantity of reflected light of an object and quantitatively indicating an improper exposure amount from the difference thereof from a proper exposure amount. However, in the field of news photographs and sports photographs, the quantitative indication is unsuitable for the above-described technique of indicating delicate substance. A further problem is that even for slight under-exposure, warning is given to attract the photographer's attention.

SUMMARY OF THE INVENTION

In order to solve such problems, it is the object of the present invention to provide an electronic flash device which indicates an improper exposure amount, and further to provide an exposure amount indicator which examines an effective combination of qualitative indication like the ex post facto warning and quantitative indication by a numerical value or a graph, regarding exposure amount, and enables indication intelligible to the photographer to be accomplished.

To achieve the above object, the exposure amount indicator according to the present invention is such that a TTL automatic light modulation electronic flash device having transmission means, control means and indication means is combined with a camera, and the electronic flash device receives a signal from the transmission means of the camera by the transmission means and the control means controls the indication means to indicate the data.

In the present invention, immediately after TTL automatic light modulation is effected, the excess and deficiency of exposure is known by communication and the result thereof is processed in the electronic flash device and indicated. Also, the electronic flash device effects the control of other warning indication on the basis of the received data.

BRIEF DESCRIPTION OF THE DRAWINGS

FIG. 8 is a flow chart showing the operation of Embodiment 4 of the present invention.

DESCRIPTION OF THE PREFERRED EMBODIMENTS

Some embodiments of the present invention will hereinafter be described in detail with reference to the drawings.

The exposure amount indicator according to the present invention has its basis in combining a camera and an electronic flash device as described below.

Figure 1:
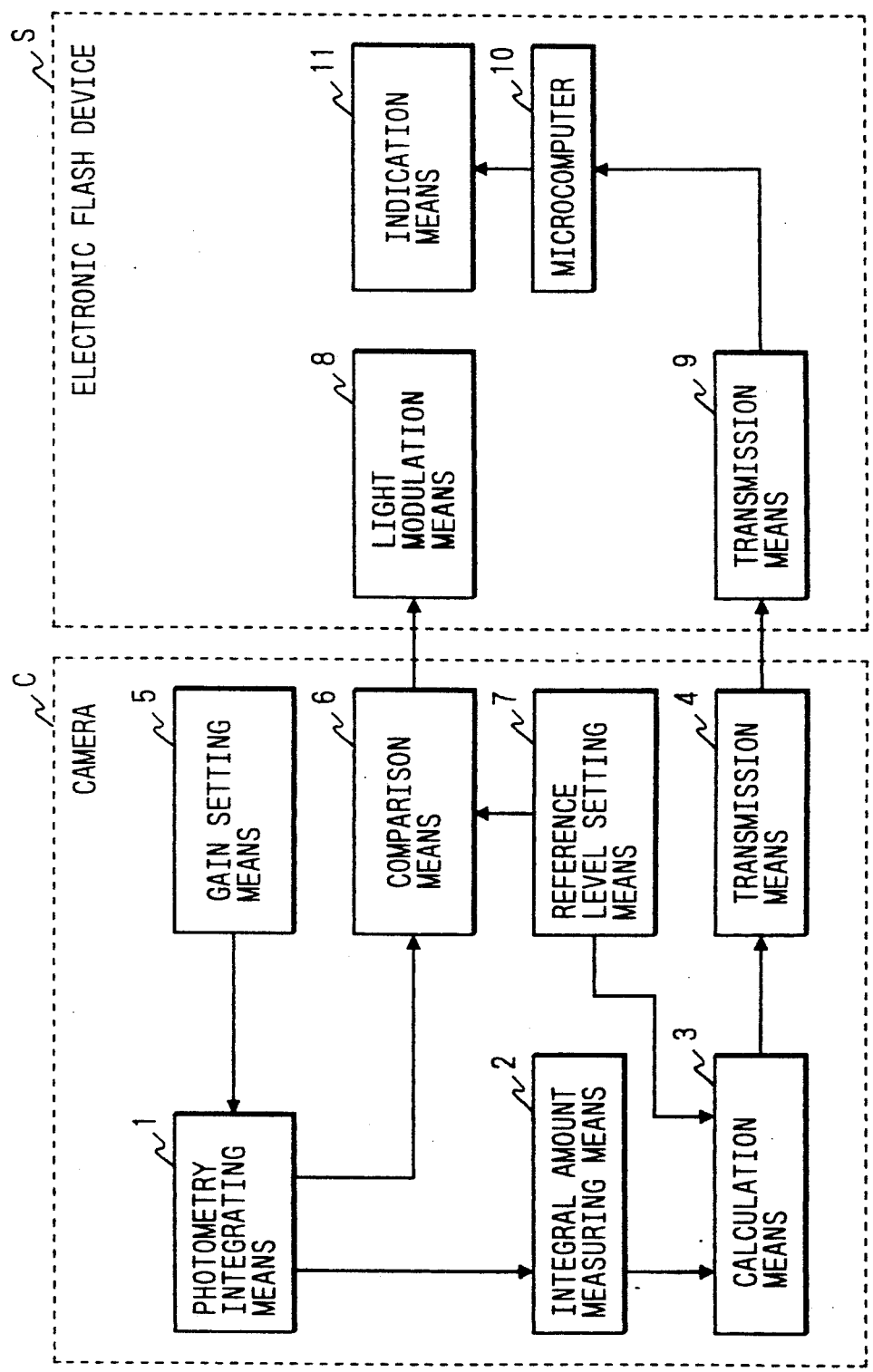
FIG. 1 is a block diagram showing the construction of Embodiment 1 of the present invention.

In FIG. 1, photometry integrating means 1, integral amount measuring means 2, calculation means 3, transmission means 4, gain setting means 5, comparison means 6 and reference level setting means 7 show the relevant internal construction of a TTL automatic light modulation camera C. The photometry integrating means 1 is comprised of an optical system for metering the light of an electronic flash device S applied to an object and reflected from the surface of film, a light receiving element, a light receiving amplifier, a gain setting circuit for the amplifier and an integration capacitor. The details of this photometry integrating means may be in accordance with the description in Japanese Laid-Open Patent Application No. 1-297635. By film speed or exposure correction value or the like, the gain setting means 5 changes over the gain of the amplifier, and the integrating means integrates the quantity of light. TTL automatic light modulation is such that a comparison between the integrated value of quantity of light and the fixed reference level set by setting means 7 is effected by the comparison means 6 and when the two become equal to each other, a light emission stopping signal is output from the camera C to the light modulation means 8 of the electronic flash device S. The integral amount measuring means 2 measures the value of the photometry integrating means 1 and memorizes it after the light emission of the electronic flash device S is stopped, that is, at a time necessary for the light emission to be stopped after the light emission stopping signal has been output, or at a point of time whereat the maximum flash time of the electronic flash device S has passed after the start of the light emission or a point of time whereat the shutter has been closed. Specifically, the integral amount measuring means 2 is a D/A converter, and the result is memorized in terms of a digital value. This value shows the exposure value by the electronic flash device S. The calculation means 3 calculates how much difference this value has relative to the reference level set by setting means 7 and how many steps the difference corresponds to. The result of this calculation is output to the electronic flash device S by the transmission means 4. The electronic flash device S receives the output of the camera C after the light emission at transmission means 9, and a microcomputer 10 controls indication means 11 to indicate the data.

Each preferred embodiment will now be described in detail.

EMBODIMENT 1

Figure 2:
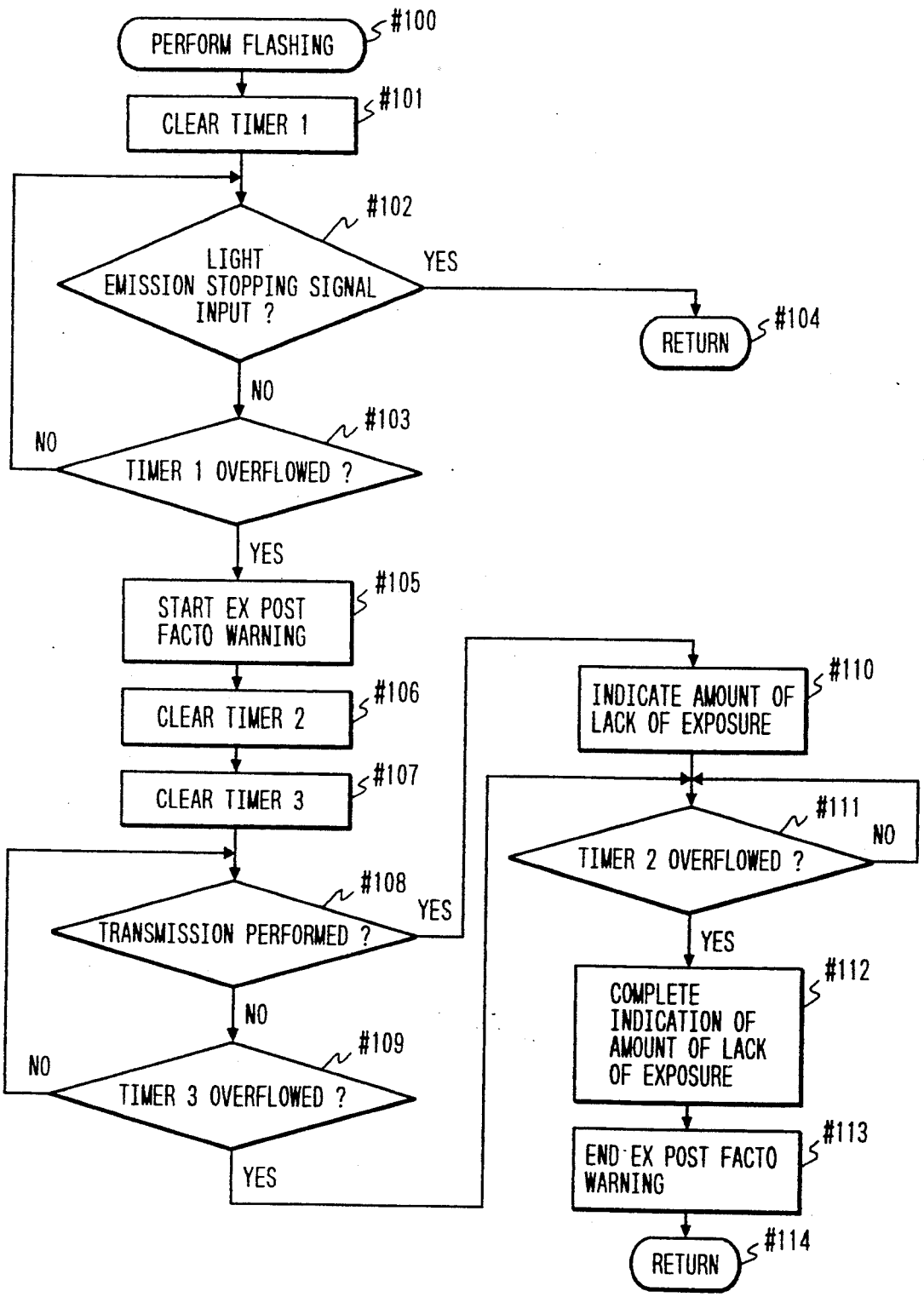
FIG. 2 is a flow chart showing the operation of Embodiment 1 of the present invention.

The operation of the microcomputer 10 of the electronic flash device S will hereinafter be described with reference to a flow chart shown in FIG. 2. This flow chart shows the process after the light emission of the electronic flash device S. With a synchro signal as the cue, this subroutine is started from a step 100 (hereinafter referred to as #100). At #101, a timer 1 is first cleared and at #102, whether a light emission stopping signal has been input to the light modulation means 8 is judged. The light emission stopping signal is not yet input immediately after the light emission and therefore, at #103, the overflow of the timer 1 is examined. The timer 1 is set so as to generate an overflow in the maximum flash time of the electronic flash device S. If before the overflow, return is made to #102. Accordingly, if the light emission stopping signal has been input before the overflow, the light modulation operation has been performed before full light emission and therefore, the emitted light can be considered to be a proper quantity of light. Accordingly, if the input of the light emission stopping signal is detected at #102, the program branches off to #104, and returns to the main routine without doing anything. On the other hand, if the overflow of the timer 1 is detected at #103, it means that a proper quantity of light has not been reached even if the photographer has waited for the maximum flash time, and under-exposure is occurring. In such case, at #105, ex post facto warning for informing the photographer of the underexposure as by flickering a ready light is started. Up to this stage is the control which was effected in the prior-art electronic flash device.

Figure 3:
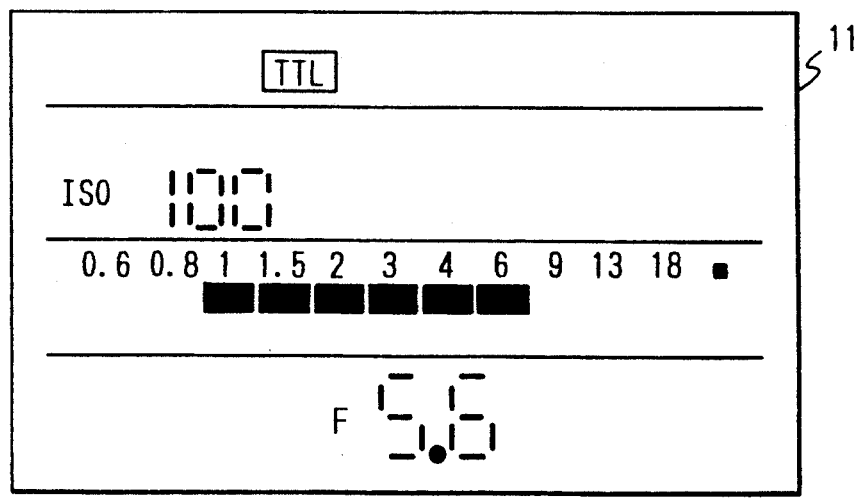
FIGS. 3 and 4 show the indication in Embodiment 1 of the present invention.
Figure 4:
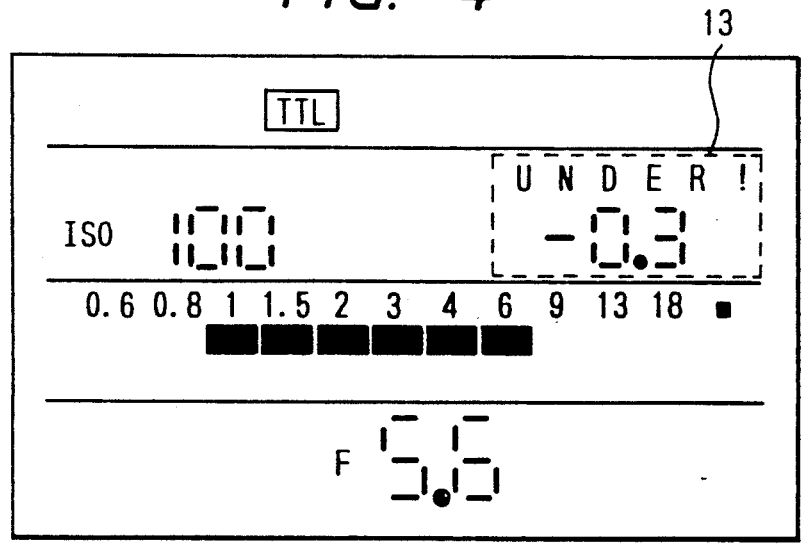

Subsequently, at #106, a timer 2 for ex post facto warning is cleared and at #107, a timer 3 for prescribing the maximum waiting time for communication is cleared. At #108, whether there has been the communication from the camera C is judged. Specifically, whether the reception completing flag of the serial interface of the microcomputer 10 is active is judged. This communication includes the aforementioned result of the calculation means 3 of the camera C, and if the reception is completed before the timer 3 overflows, it means that communication could be done normally. The timer 3 is set to a maximum interval, e.g. 100 ms, at which the camera C effects communication with the electronic flash device S, and if at #109, the timer 3 overflows, it means that the camera C is of an old type having no communication function or that transmission could not be done within a prescribed time due to some trouble, in which event #110 is skipped. Accordingly, only when communication is done normally, the program branches off from #108 and carries out the process of #110 of indicating the amount of lack (insufficiency) of exposure. The indication of the amount of lack of exposure of #110 is effected with the result of the calculation means 3 indicated by the microcomputer 10 controlling the indication means 11. The indication means 11 is, for example, a liquid crystal indicator, and normally effects an indication as shown in FIG. 3. In the indication of the amount of lack of exposure of #110, it is indicated that, as shown in FIG. 4, the indication 13 was a lack of quantity of light of 0.3 step. This indication 13 may be flickered, for example, in synchronism with the flickering of the aforementioned ex post facto warning. Return is made to the flow of FIG. 2, and at #111, the overflow of the timer 2 is examined. The timer 2 is set so as to overflow in several seconds for the ex post facto warning time, and a loop is repeated at #111 until the timer 2 overflows. When the ex post facto warning time ends, at #112, the indication of the amount of lack of exposure, i.e., the indication 13 of FIG. 4, is completely turned off and subsequently, at #113, the ex post facto warning ends, and at #114, return is made to the main routine.

What has been described above is the control procedure of Embodiment 1, and however the order of #105–#107 and #112–#113 may be, the same result will be obtained because the processing speed of the microcomputer 10 is sufficiently high. #102–#103 or #108–#109 also repeat a loop and therefore, the relation of order may be changed while the relation of branch-off remains kept.

Further, even if the items regarding the ex post facto warning are all deleted, the indication of the amount of lack of exposure can be effected and therefore, the ex post facto warning may be omitted depending on the convenience of the indicating member of the electronic flash device S.

EMBODIMENT 2

Figure 5:
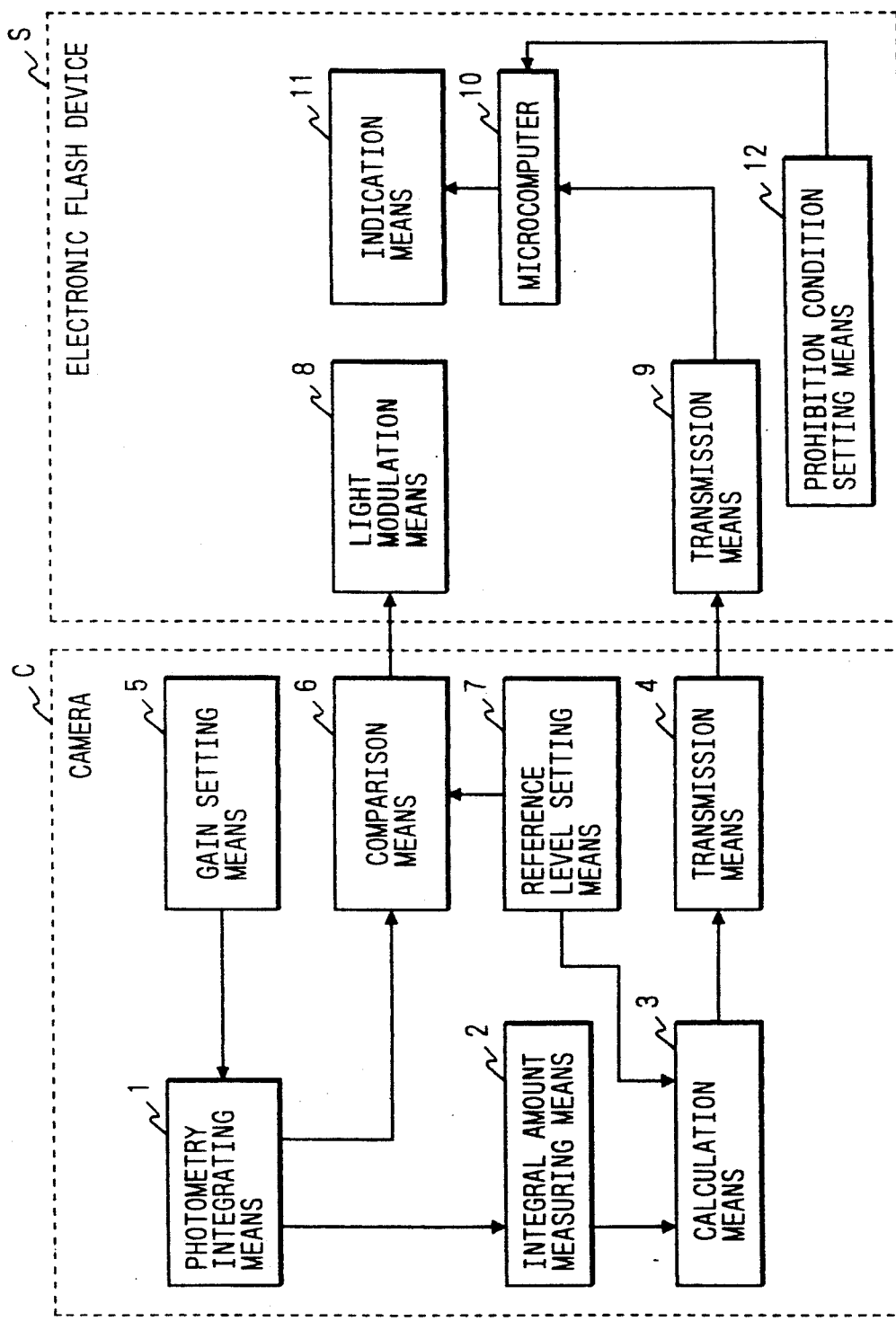
FIG. 5 is a block diagram showing the construction of Embodiment 2 of the present invention.

Embodiment 2 is an embodiment in which prohibition condition setting means 12 for setting the prohibition condition of warning indication is added to the construction of Embodiment 1, and assumes the construction shown in FIG. 5. The prohibition condition setting means 12 may be one capable of setting any value, but description will be made with a predetermined fixed value as the simplest example.

Figure 6:
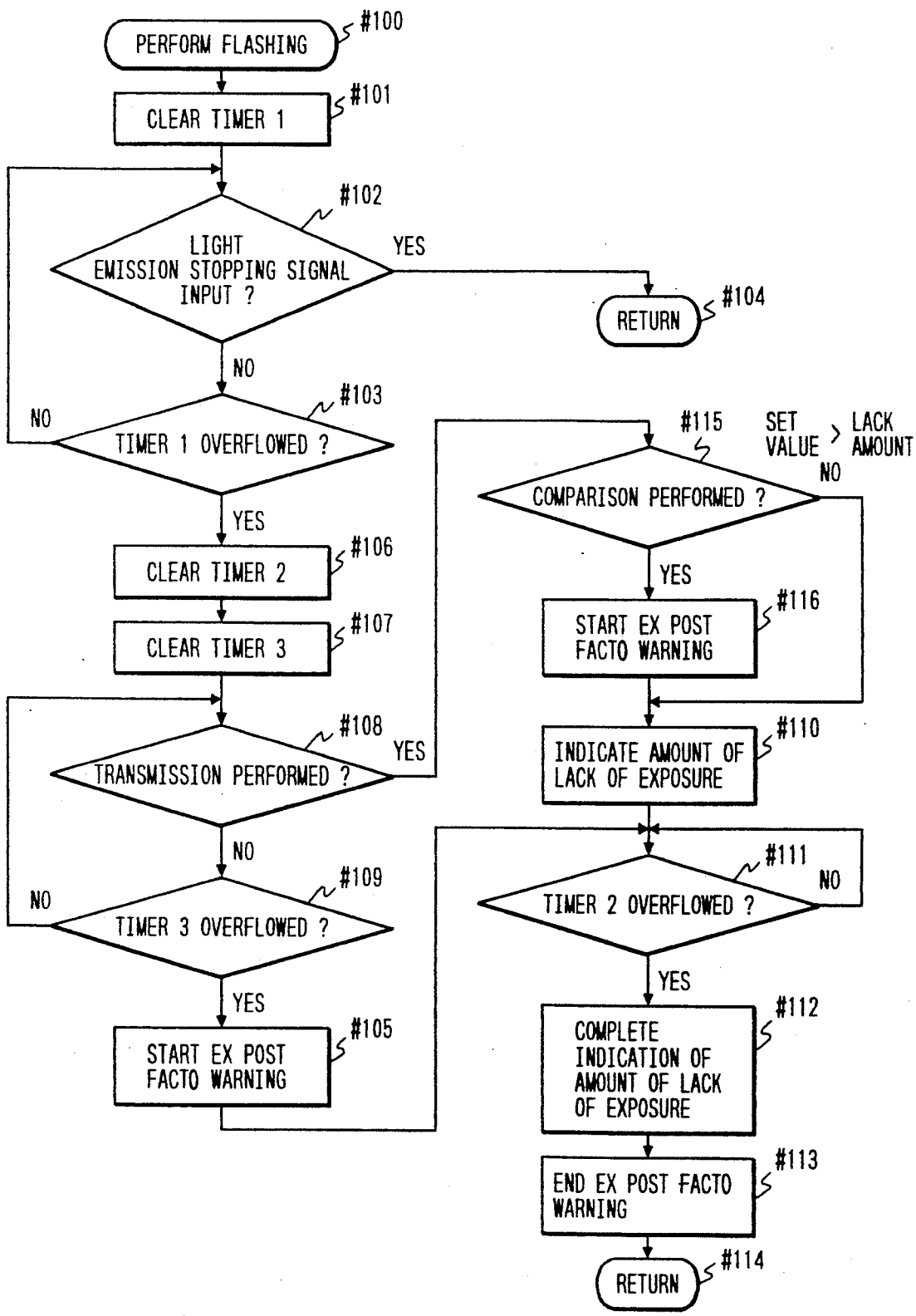
FIG. 6 is a flow chart showing the operation of Embodiment 2 of the present invention.

The flow chart of FIG. 6, as in Embodiment 1, shows the control of the microcomputer 10, but an object of Embodiment 2 is to indicate the ex post facto warning are to effect the indication of the amount of lack of exposure only if the lack of exposure is equal to or beyond a permissible value. In the flow chart of FIG. 6, process items common to those in Embodiment 1 are represented by the same numbers and need not be described. In Embodiment 2, the ex post facto warning is moved to next to #109, and by the timer of #103 simply overflowing, the ex post facto warning is discontinued unconditionally. If it is seen at #108 that communication has been completed, at #115, the comparison between the absolute values of the amount of lack of exposure and the set value by the prohibition condition setting means 12 is effected. The set value by the prohibition condition setting means 12 is a value for which the lack of exposure can be allowed, for example, a value corresponding to an exposure amount 0.5 step. If the absolute value of the amount of lack of exposure is smaller than the absolute value of the set value, the start of the ex post facto indication of #115 to #116 is skipped and the indication of the amount of lack of exposure of #110 is effected. Also, if the absolute value of the amount of lack of exposure is greater than the absolute value of the set value, the start of the indication of the ex post facto warning of #116 is effected. The substance of this #116 is equal to the substance of #105. Thereafter, as in Embodiment 1, return is made to the main routine. When the start of the indication of the ex post facto warning of #116 has been skipped, the termination of the indication of the amount of lack of exposure of #112 is effected, but there is no problem even if the program goes by way of #112 in a state in which originally the indication is not being effected. Also, the program goes by way of #105 even if the camera C is of an old type having no communication function and therefore, interchangeability is also secured.

EMBODIMENT 3

Embodiment 3 is an embodiment in which the indication means is eliminated from Embodiment 2. It is, for example, the case of a very inexpensive electronic flash device having no liquid crystal indication. Even such an electronic flash device has a ready light at the minimum and is therefore capable of the ex post facto warning indication.

Figure 7:
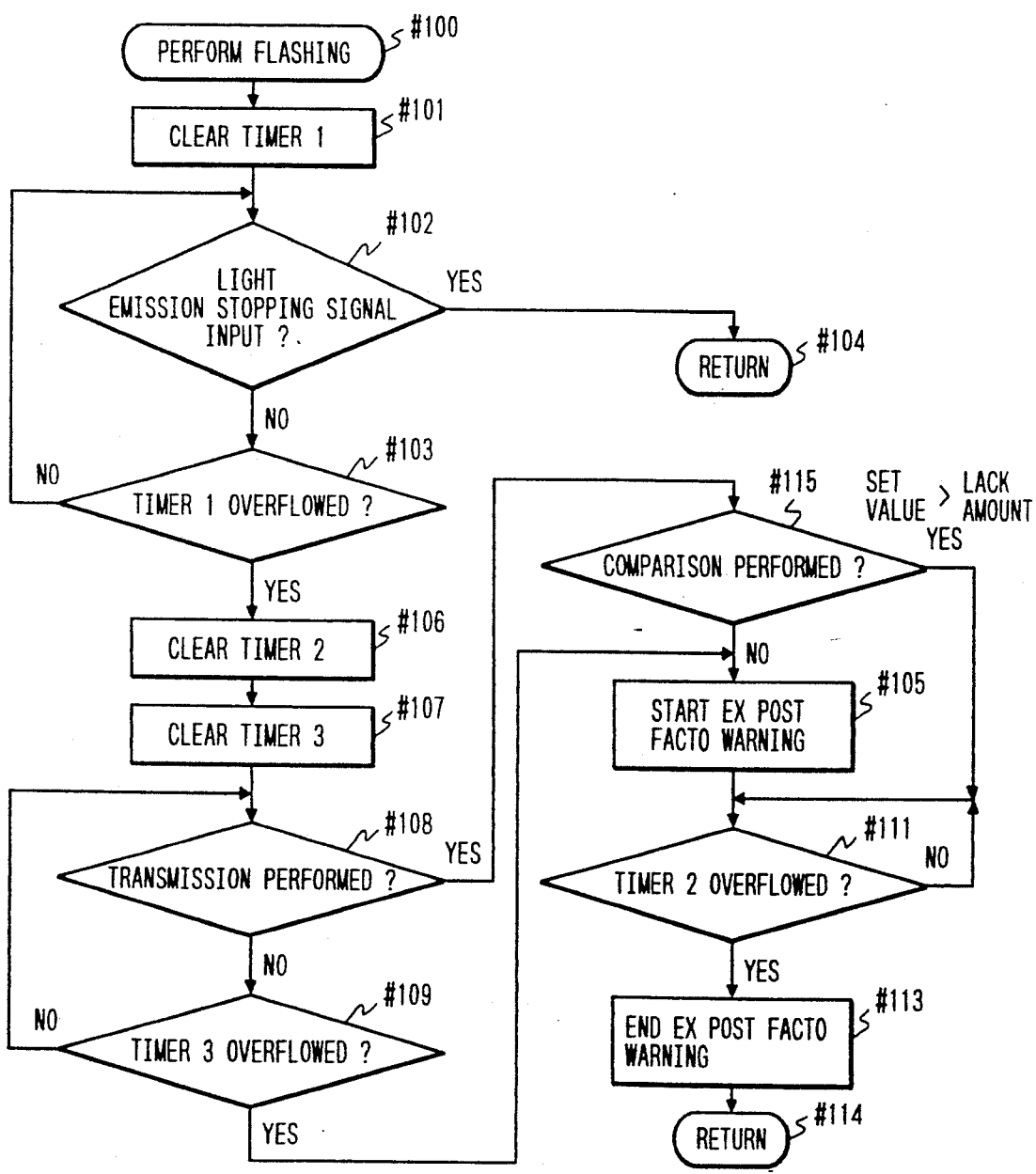
FIG. 7 is a flow chart showing the operation of Embodiment 3 of the present invention.

In such a construction, in the flow chart of FIG. 7, the items (#110 and #112) regarding the indication of the amount of lack of exposure is are eliminated from Embodiment 2. Accordingly, the ex post facto warning indication can be turned on only when the amount of lack of exposure is great. Also, interchangeability similar to that of Embodiment 2 is secured even if the camera C is of an old type having no communication function.

EMBODIMENT 4

Embodiment 4 is an embodiment which intends to indicate excess or lack at all times, in contrast with Embodiments 1 to 3 which indicate the amount of under-exposure but not over-exposure. The return at #104 is eliminated and even if the light modulation operation is effected before full light emission, the process subsequent thereto is continued. That is, if communication is done from the camera C, the program goes through the process of the indication of the excess or lack of exposure of #117 without fail.

As has hitherto been described, according to the present invention, there are obtained the following very advantageous effects.

In Embodiment 1, the presence of the indication of the lack of exposure has made it possible for the photographer to judge whether re-photographing is necessary when lack of exposure occurs. Also, how much the aperture of the photo-taking, lens should be opened for re-photographing will be known.

In Embodiment 2, indication is effected only when there is serious lack of exposure, and warning indication is not turned on for slight lack of exposure and thus, no unnecessary concern or distraction is caused to the photographer.

In Embodiment 3, an effect similar to that of Embodiment 2 can be obtained even in the case of a very inexpensive electronic flash device having no liquid crystal indication.

In Embodiment 4, not only under-exposure but also over-exposure may be indicated, and it is thus possible to ascertain a failure in photographing easily.

We claim:

1. A camera system having an electronic flash device emitting flash toward an object, said camera system including:
   integration means for integrating a light beam from said object during flash photographing and producing an integrated value;
   means for comparing said integrated value with a reference value and outputting a stopping signal for stopping flash emission;
   warning means for detecting that said stopping signal has not been output when said electronic flash device has emitted light with a maximum possible quantity of emitted light and for giving warning;
   means outputting an insufficiency signal indicative of an amount of insufficiency of the exposure amount of said flash photographing from a proper exposure amount; and
   control means responsive to said insufficiency signal to control said warning means, said control means prohibiting said warning means from giving warning when said amount of insufficiency is within a predetermined range.

2. A camera system according to claim 1, further including indication means and wherein said control means is responsive to said insufficiency signal to cause said indication means to indicate said amount of insufficiency.

* * * * *